United States Patent
Pawlowsky et al.

(10) Patent No.: US 10,548,301 B2
(45) Date of Patent: Feb. 4, 2020

(54) SALT-COMPOSITION FOR SUPPLEMENTING A MINERAL BALANCE IN THE AQUARISTIC AREA, READY FOR USE SOLUTION OF SAID SALT-COMPOSITION, USE OF SAID SALT-COMPOSITION, AND AQUARISTIC ORNAMENTAL STONE OBTAINED BY SAID USE

(71) Applicant: AQ Marketing AG, Hünenberg (CH)

(72) Inventors: Ernst Pawlowsky, Wetzlar (DE); Hans-Werner Balling, Lauterbach (DE)

(73) Assignee: TROPIC MARIN AG, Hunenberg (CH)

( * ) Notice: Subject to any disclaimer, the term of this patent is extended or adjusted under 35 U.S.C. 154(b) by 359 days.

(21) Appl. No.: 14/721,008

(22) Filed: May 26, 2015

(65) Prior Publication Data
US 2015/0342160 A1  Dec. 3, 2015

(30) Foreign Application Priority Data
May 27, 2014  (DE) .................. 10 2014 007 673

(51) Int. Cl.
*A01K 63/04*  (2006.01)
*A01K 63/00*  (2017.01)
(Continued)

(52) U.S. Cl.
CPC ............ *A01K 63/04* (2013.01); *A01K 63/006* (2013.01); *A23K 20/10* (2016.05); *A23K 20/20* (2016.05); *A23K 20/24* (2016.05); *A23K 50/80* (2016.05)

(58) Field of Classification Search
CPC ...... A01K 63/04; A01K 63/006; A23K 50/80; A23K 20/20; A23K 20/10; A23K 20/24
See application file for complete search history.

(56) References Cited

U.S. PATENT DOCUMENTS

| | | | | |
|---|---|---|---|---|
| 4,327,070 A | * | 4/1982 | Meyers ................. | C07C 51/412 310/11 |
| 5,935,625 A | * | 8/1999 | Hjørnevik .............. | A23K 50/00 426/2 |

(Continued)

FOREIGN PATENT DOCUMENTS

CN  1472186 A  *  2/2004

OTHER PUBLICATIONS

Machine Translation of Publ. No. CN1472186 (A), published Feb. 2004, European patent Office, obtained online @ http://ep.espacenet.com/?locale=EN_ep (Downloaded Apr. 15, 2017), pp. 1-4.*

(Continued)

*Primary Examiner* — Michael A Salvitti
(74) *Attorney, Agent, or Firm* — Mark M. Friedman

(57) ABSTRACT

A salt-composition for stabilizing the carbonate balance in the aquaristic area (i.e., aquariums), wherein the salt-composition has major components of at least 10 weight percent formates. The salts contain no fatties, proteins or sugars and stabilize the carbonate balance individually, being essentially disconnected from biochemical metabolism-cycles. The alkaline, ready to use solution of the salt composition supports advantageously skeleton- and reef-building sea-water-systems in their bio-mineralization.

Use of the salt-composition to acidicly activate carbonate-containing aquaristic ornamental stones provides special substrates, on which bio-mineralizing systems of sea-water aquariums settle and grow quicker and better.

8 Claims, 1 Drawing Sheet

(51) Int. Cl.
*A23K 20/10* (2016.01)
*A23K 20/20* (2016.01)
*A23K 20/24* (2016.01)
*A23K 50/80* (2016.01)

(56) References Cited

U.S. PATENT DOCUMENTS

| | | | | |
|---|---|---|---|---|
| 6,137,005 | A * | 10/2000 | Hjørnevik | C07C 51/412 |
| | | | | 562/609 |
| 6,477,982 | B1 * | 11/2002 | Ritter | A01K 63/04 |
| | | | | 119/231 |
| 6,979,411 | B1 * | 12/2005 | Ritter | A01K 63/04 |
| | | | | 119/231 |
| 2005/0010067 | A1 * | 1/2005 | Slany | C07C 51/09 |
| | | | | 562/609 |
| 2011/0189365 | A1 * | 8/2011 | Tagrin | A23C 1/06 |
| | | | | 426/531 |
| 2015/0342160 | A1 * | 12/2015 | Pawlowsky | A23K 20/10 |
| | | | | 119/231 |

OTHER PUBLICATIONS

ALFA AESAR Research Chemicals, Metals and Materials, Sep. 2008, 26 Parkridge Road, Ward Hill, MA 01835-6904, USA, p. 413, A18916.*

* cited by examiner

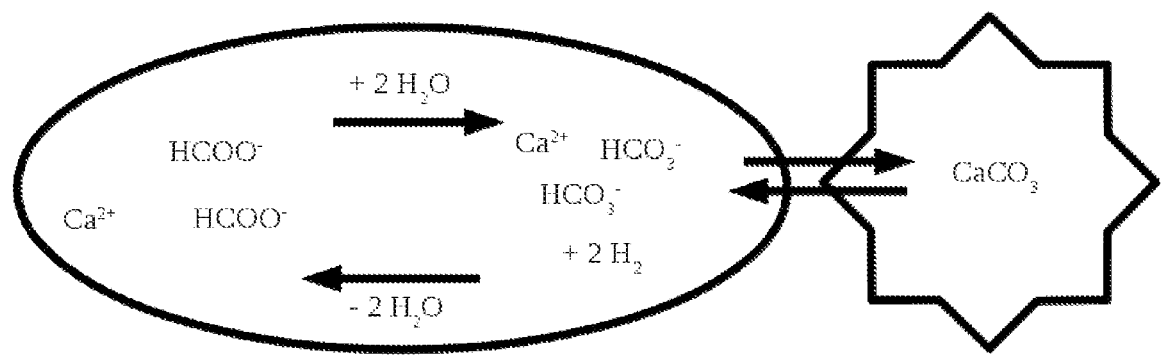

US 10,548,301 B2

SALT-COMPOSITION FOR SUPPLEMENTING A MINERAL BALANCE IN THE AQUARISTIC AREA, READY FOR USE SOLUTION OF SAID SALT-COMPOSITION, USE OF SAID SALT-COMPOSITION, AND AQUARISTIC ORNAMENTAL STONE OBTAINED BY SAID USE

TECHNICAL AREA

The present invention concerns the aquaristic area (i. e. the area of keeping and raising plants and/or animals in an aquarium) according to the preamble of independent claims.

'aquaristic' designates in the present case the area of sea-water- and fresh-water-aquaristics. Users of this area keep and raise plants and animals in display-aquariums, as well as in domestic areas for decoration. Salts and salt-compositions for this area are generically produced free of compounds that are toxic to fish like detergents, heavy metals or pesticides, so as to keep the usual microclimate of an aquarium in a range physiologically acceptable to the raised organisms, and allow a continuous breeding and/or decorating function. In the present case special attention is given to the area of seawater-aquaristics, comprising organisms, which produce mineral skeletons and housings. Typical examples for these are reef-producing organisms like corals or other organisms that produce carbonate-based outer platings, shells or skeletons, which is a known feature of certain types of clams and algae. Such organisms extract carbonates and accompanying cations from the water by bio-menralization. Therefore there is a general need to keep the level of carbonate and cations—which is kept constant in natural sea-water by sedimentary rocks—in an aquarium equally constant at a level that is beneficial for the purpose of growth of said organisms.

PRIOR ART

The present invention proposes to said purpose to apply salts of non-branched carbon acids having an uneven number of C-atoms. Prior art knows such general measures and mixtures, which are to be applied in the aquaristic area and aim at providing beneficial life- and breed-conditions.

From DE 26 41 676 A1 it is known for a long time to preserve animal's fodder by addition of mixtures of carbon acids, comprising formic acid, so as to keep it storable and usable for longer periods of time. Such additives are added usually in amounts of a few weight percent and protect nutrient mixtures from premature decay. Similarly U.S. Pat. No. 3,889,007 A discloses a nutrient mixture for sea fish, which provides the needed minerals by addition of seawater or seawater-concentrate, wherein additions of magnesium- as well as calcium-salts may additionally ensure a sufficient amount of minerals needed by shell-building crustaceans. Additionally to inorganic salts, organic salts like lactates may be applied as long as the respective anions are not detrimental to the organisms and are able provide the beneficial cations.

A disadvantage of the generic salt-compositions is that these comprise regularly nutrients, which are digested in different ways via the individual metabolism of the bred and exhibited fish and microorganisms. Thus, such a composition influences in a not reliably predictable way parallel equilibria like the phosphate-equilibrium or the nitrate-equilibrium. Such can result in a charge of water that has to be exchanged within one day in spite of the content of carbonates still being sufficient for providing components for bio-mineralization.

Known strategies to overcome this problem suggest equilibrating the water of an aquarium constantly with coral rag. Said mineral does often contain phosphates and/or nutrients characteristic for corals and influences also several equilibria at the same time, thus being unable to overcome the predescribed disadvantage. Carbon acids with an even number of C-atoms like acetates can equally be degraded via fast, biochemical metabolism-processes as C2-molecule/acetyl-coenzyme A. Thus the established, continuous methods and their application are likewise disadvantageous and necessitate a continuous, almost hourly monitoring of parallel metabolism-equilibria.

It was therefor an object of the present invention to overcome the disadvantages of the prior art and provide a salt-composition which acts parallel to the supply of organisms with feed-compositions and is capable to provide a stabilized carbonate content within an aquarium for 24 hours, especially in a sea-water aquarium.

The solution of said object is obtained according to the features of the independent claims. Advantageous embodiments, uses and ways of application and thus obtainable, new products can be derived from derived claims, dependent claims, and the following specification.

SUMMARY OF THE INVENTION

According to the invention a salt-composition for supplementing a mineral balance in the aquaristic area is characterized in that the salt-composition contains at least one major component, having respectively at least 10 weight percent, at least one alkali-salt or alkali-earth-salt of a non-branched carbon acid having an uneven number of C— atoms.

Furthermore, a solution of the inventive salt-composition claimed, which is a ready for use solution of the proposed salt-composition for supplementing the mineral balance in the aquaristic area, the transparent solution having a pH-value of 8+−0.8; a content of solid, sediment-forming particles, detectable by visual inspection (i. e. directly visible to the human eye), of below one weight percent and a content of salt of 15+−5 weight percent.

Furthermore, a use of the claimed salt-composition for supplementing a mineral balance in the aquaristic area is claimed, the salt-composition containing as major component of at least 80 weight percent calcium(II)formate Ca(HCOO)2 and/or magnesium(II)formate Mg(HCOO)2 and contains as minor component having 5+−4 weight percent at least one carbonate of at least one metal selected from the group consisting of Mg, Ca, Sr, Li, Na, K, wherein the carbonate of the salt-composition is reacted with a 10-percent surplus amount of formic acid and an ornamental, porous, carbonate-based, aquaristic stone is then infiltrated with the thus-obtained, acidic solution, effecting activation of the stone by concluding reaction of the formic acid with the carbonate of the stone.

Furthermore, the present invention claims the activated, natural or identically man-made, carbonate-based, aquaristic ornamental stone, obtained by the predescribed use, having in its pores a slightly alkaline solution of the inventive salt-composition.

DESCRIPTION OF THE INVENTION AND ADVANTAGEOUS FEATURES

Deviating from the established and disadvantageous compositions the presently claimed salt-composition consists solely of salts, which act as non-degradable nutrient and do not instantly engage in parallel metabolism-equilibria like the phosphate- or nitrate-equilibria. The salt-composition is thus combined in a way that comprises no fatties, proteins or sugars; it contains only minerals which can contribute to a bio-mineralization in the aquaristic area and can stabilize the related carbonate balance, without being able to cause interfering products of feed-metabolisms.

According to the invention the salt-composition for supplementing a mineral balance in the aquaristic area contains at least one major component, having respectively at least 10 weight percent, at least one alkali-salt or alkali-earth-salt of a non-branched carbon acid having an uneven number of C— atoms.

Non-branched carbon acids having an uneven number of C-atoms are no usual metabolism-products and in common metabolism-cycles they are degraded either slowly or not at all. The inventors assume that this may explain, that a salt-composition with a relevant amount of such salts is capable of stabilizing the carbonate balance without remarkably influencing the oxygen-balance or nutrition-balance. Said effect can be explained by the following, non-binding reaction-theory:

Common metabolism-cycles build carbon acids from C2-molecules and degrade them likewise via said molecules; carbon acids having an uneven number of C-atoms are degraded slowly—but also via C2-molecules—which will finally result in each case in a remaining molecule containing only one C-atom. In case of the preferably applied formic acid (methanoic acid) said molecule is directly given as formate-anion HCOO. Formic acid is known to be decomposable catalytically at room temperature as follows:

$HCOOH = CO_2 + H_2$ in words:

formic acid is in equilibrium with carbon dioxide and hydrogen

Carbon dioxide/$CO_2$ is known to react with water, producing hydrocarbonate (formula: $(HCO_3)^-$) by deprotonation.

Upon providing a salt of formic acid with a concentration of at least 10 weight percent—as case may be together with further, inorganic salts—the following, similar reaction in the presence of a catalyst can take place:

$HCOO^- + H_2O = (HCO_3) + H_2$ in words:

formate+water=hydrocarbonate+hydrogen

The predescribed model shows that formates in the presence of catalysts in aqueous solution may be in equilibrium with hydrocarbonates and thus also with carbonates. The presence of suitable, catalytically active trace elements can not be excluded, especially in the case of natural mineral additives like sea water or biominerals of natural origin. It goes without saying that the inventors do not wish to be bound by said theory; the theory only shows a stabilization of a carbonate-balance without influencing biochemical metabolism-cycles to be consistently explainable. With the present reaction-model the experimentally found, considerable stabilization of carbonate hardness in a sea-water aquarium containing bio-mineralizing organisms can be explained conclusively. With the presently suggested salt-composition a carbonate balance could always be stabilized for a period of one day, the growth-rate/rate of mineralization being consistently stable and higher. Similar strategies, which apply only mineral components, are not known to the inventors. Such can be attributed to the fact, that established products and compositions always comprise nutrients or the amount of the relevant carbon acids is too small within the solid or nutrient composition to effect any remarkable stabilization of the carbonate balance.

Depending on the type of bio-mineralization to be supported alkaline salts or alkaline earth salts may be selected and adjusted to the respective ratio. While plating- and reef-building systems may often be supported with calcium- and/or magnesium-salts as main component, some symbiotic algae require higher amounts of Li, Na, K, Ba, Sr or also Fe, to develop typically coloured, mineral structures. Especially preferred are calcium- and/or magnesium-salts as main component.

The respective carbon acid anions may be of equal or differing nature. Formates, propionates, valerates and enanthates (heptanoates) may also be supplied as mixture, as long as the concentration of the respective salts is physiologically acceptable for the respective breeding/growing organisms. Preferably main components are only formates in case of heavily carbonate consuming systems like for example decorative reefs, so as to keep growth and carbonate-supply at the maximum.

Preferably the salt-composition is characterized in that the salt-composition contains as at least one minor component, having respectively 5+−4 weight percent, a halide of an alkaline earth metal. Especially preferably such minor components supply beneficial halide ions for symbiotic algae, which show a raised demand for anions of halides, preferably iodine and/or fluorine.

Preferably the salt-composition is characterized in that the salt-composition contains as at least one trace component, having respectively up to 1 weight percent, at least one inorganic salt of a metal, said metal being a metal selected from the group consisting of Li, Rb, In, Ba, Al, Fe, Zn, Mo, Be, B, Si, Ti, Sc, Mn, V, Cr, Fe, Co, Ni, Se. Especially, preferably colour-inducing or coloured complexes and/or structures and platings enabling cations are thus provided in an ornamental aquarium.

Preferably the salt-composition is characterized in that the salt-composition has at least one weight part per thousand of sediment forming particles. Providing a salt of low solubility, as can be found in natural sediments, ensures the concentration of the respective cation to be similar to the concentration within natural sea-water. Providing an amount of solid barium sulfate ensures especially preferably a sufficient, average supply with said trace element.

Preferably the salt-composition for supplementing the mineral balance in the aquaristic area is characterized in that it contains as major component with at least 80 weight percent calcium(II)formate of the formula $Ca(HCOO)_2$, up to 15 weight percent minor components, up to 3 weight percent trace components, remaining weight percent being sediment forming, alkaline particles and unavoidable contaminants.

In this composition the sediment forming, alkaline particles indicate in an easy and directly inspectable way a pH-value that has been set to the correctly, alkaline value as needed for sea-water. 'Sediment forming' relates to the particles providing at least part of the naturally in sediments occurring salts like the mineral salts that can be found in natural carbonates and/or silicates.

In especially advantageous embodiment a thus composed mix of salts indicates with its sediment forming particles, which descend slowly and accumulate at the bottom, a pH-value which is correctly held in the alkaline region, because in case of an acidic pH-value the alkaline particles would corrode and dissolve. Thus the sediment-forming, alkaline particles—preferably finely dispersed and aqueously precipitated carbonates—serve as easily checkable sign of quality of the salt mix itself and provide at the same time the possibility to check the pH-value of a sea-water aquarium directly. Such allows an easier and more advantageous use of the salt-compositions as such and of the respective solutions and provide a higher compliance on the customers' side.

Preferably the salt-composition is characterized in that at least one of the major components, minor components or trace components has been obtained by reaction of a carbonate with formic acid. Thus produced formates showed repeatedly the best growth rates/mineralization-rates. The inventors assume carbonates to contain as traces common, accompanying substances, which are important for the biological availability of components and for the speed of mineralization. Especially advantageous were carbonates that were of natural maritime or primeval origin.

Preferably the Salt-composition is characterized in that the salt-composition contains as major component of at least 80 weight percent calcium(II)formate $Ca(HCOO)_2$ and/or magnesium(II)formate $Mg(HCOO)_2$ and contains as minor component having 5+−4 weight percent at least one carbonate of at least one metal selected from the group consisting of Mg, Ca, Sr, Li, Na, K. Such a salt-composition supports advantageously cultures of symbiotic, maritime nature, which form mostly carbonate-based structures like reef or endoskeletons. Within such cultures—additionally to the beneficial stabilized carbonate balance—the cations support with remarkably higher concentrations the mineralization also.

According to the invention a ready for use solution of the presently suggested salt-composition for supplementing the mineral balance in the aquaristic area is characterized by the transparent solution having a pH-value of 8+−0.8; a content of solid, sediment-forming particles, detectable by visual inspection, of below one weight percent a content of salt of 15+−5 weight percent.

'transparent' relates to solutions which are clear to the eye with a liquid column of at least 50 centimeters and allow without difficulty to recognize obstacles/objects behind said solutions. The solution is not 'milk-like' in appearance and does not contain cations in concentrations that could impede as colloid phosphate-, sulfate- or carbonate-precipitates the transparent nature of the water of an aquarium.

A pH-value of 7.2 to 8.8 is in the alkaline region and can similarly be found in maritime areas in the presence of freshly rinsed sedimented shoals and natural rocks. Such an adjustment allows the solution especially to be used in sea-water aquariums without having to heed a lowering of the pH value that would be non-tolerable for the respective organisms. A salt content of 15+−5 weight percent ensures that even in the case of an excessive overdose no toxic concentrations of minerals will occur; as long as the solution is only added to an aquarium during its normal use damaging of the organisms due to excessive salt concentration is barely possible.

In combination with the predescribed, sediment forming, alkaline particles an especially user-friendly product is provided, which allows effectively supporting bio-mineralization by stabilization of the carbonate balance and parallel increase of the concentration of the needed cations.

Furthermore, the present invention suggests a use of a salt-composition for supplementing the mineral balance in the aquaristic area, wherein a solid carbonate of the salt-composition is reacted with a 10-percent surplus amount of formic acid. During said reaction the carbonate is completely dissolved and the surplus of acid results in an acidic, aqueous solution of the salt composition. With said acidic solution an ornamental, porous, carbonate-based, aquaristic stone is then infiltrated.

Ornamental aquaristic stones serve to decorate aquariums as cover of air-supply or CO2-supply or as a growth-substrate for algae and microorganisms. Being at least partially porous is a native feature of such ornamental stones and they can be penetrated completely by a liquid or a gas via continuous pore-channels. Such ornamental stones often contain a large amount of 20 weight percent and more of carbonates and can be designated as 'carbonate-based'.

An infiltration with an acidic solution thus requires a diligent, complete soaking of an aquaristic ornamental stone with said solution. Such can advantageously be provided by quick, complete submersion of such an ornamental stone in the predescribed, acidic solution until no further, characteristic bubbles of carbon dioxide are produced/the pH-value has reached a stable level in the alkaline region.

Thus, an activation of the stone by concluding reaction of the formic acid with the carbonate of the stone is affected. An ornamental stone is obtained that provides throughout its pores and channels continuously beneficial minerals and an adjusted pH value for bio-mineralization. Such allows especially advantageously inoculation and/or afresh application of such an ornamental stone with skeleton- and reef-building organisms. In comparative experiments such conditioned substrates allowed remarkably quicker, more successful and more reliably the growth/settling of mineralizing cultures.

Thus, the present invention also claims an activated, natural or identically man-made, carbonate-based, aquaristic ornamental stone, obtained by the predescribed use, having in its pores a slightly alkaline solution of the inventive salt-composition for supplementing a mineral balance in the aquaristic area. Said solution has typically a pH-value of 8+−0.8; a content of solid, sediment-forming particles, detectable by visual inspection, of below one weight percent and a content of salt of 15+−5 weight percent.

Further advantages become apparent in view of the embodiments. The predescribed features and advantages and following embodiments are not to be understood as limiting the present invention. Advantageous, additional features and additional combinations of features, as they are explained in the specification, may be applied within the scope of the independent claims individually as well as in deviating combinations, without leaving the scope of the present invention.

SHORT DESCRIPTION OF FIGURES

FIG. 1 represents in a model sketch the advantageous support of a bio-mineralization in the aquaristic area with the help of the suggested salt composition.

DETAILED DESCRIPTION OF THE INVENTION IN VIEW OF EMBODIMENTS

FIG. 1 represents in a model sketch, how the advantageous support of a bio-mineralization in the aquaristic area with the suggested salt-composition may be explained: In an aqueous, slightly alkaline solution, represented by the ovally surrounding line, calcium(II)formate is present in dissolved, singular ions. Similarly to the known, catalytic reaction of formic acid at room temperature, resulting in CO2 and hydrogen, an equilibrium may be outlined, which links the respective hydrocarbonates to formates. Hydrocarbonates are in equilibrium with the carbonates of the skeletons, platings and structures of the organisms of the aquarium. The solid carbonates resulting from this bio-mineralization are depicted as eight-fold star. The double arrow linking said star to the oval, aqueous solution represents the chemical equilibrium, which links the biominerals with the hydrocarbonates. Within this formal model the biomineral $CaCO_3$ may be obtained from $Ca^{2+}$ and 2 $(HCO_3)^-$ by producing one molecule of water and one molecule of carbon dioxide. The explanatory model shows that dissolved formates can be in chemical equilibrium with carbonates/hydrocarbonates. The inventors deem this to be responsible for the fact that the carbonate balance and the bio-mineralization in a sea-water aquarium can be supported according to the invention, without interfering with the metabolism-cycles of proteins, fatties or sugars. The latter shall be shown in more detail in the following embodiments.

In an advantageous embodiment a ready to use solution is obtained by dissolving 130 g calciumformate in water purified by reverse osmosis so as to obtain one liter of solution. To that end 900 ml of said water are provided, 130 g of pharmaceutically pure calciumformate are added as powder and dissolved completely within a few hours by mechanically stirring the mixture. Concludingly the solution is replenished—after adding further, barely soluble, sediment forming minerals on sulfate basis—to one liter total volume. The solution contains as main component calciumformate (according to the present invention ingredients can be classified according to their concentration; major components have a content of 10 or more weight percent, minor components have a content in the area of a few to one weight percent, and trace components are contained with less than one weight percent).

The solution replenished to one liter total volume contains roughly 40.000 mg/l calcium. Experimental practice showed this salt-solution to have the same effect as a liter of aqueous solution having a carbonate hardness of 5000 degrees 'KH' ('KH'=carbonate hardness; hardness caused by hydrocarbonates that may be removed/precipitated by heat). The inventive solution was stable and applicable in spite of varied temperatures and showed in application in a sea-water aquarium with reef-forming organisms a very low consumption of oxygen; such allowed the verification of carbonate balance and the addition of further solution to be extended to a period of 24 hours, without the occurrence of a shortage of carbonate-supply. The inventors attribute the latter to the fact that stabilization of the mineral balance is effected by formates, which are disconnected from the parallel nutrient and metabolistic cycles of the organisms. Thus, it was possible for the first time to remove the necessity to adjust a carbonate balance within 24 hours repeatedly in spite of substantial bio-mineralization due to present, reef-building systems, which are known to deplete the available carbonates.

In a further, advantageous embodiment a ready to use solution is obtained by dissolving 115 g magnesiumformate in water purified by reverse osmosis and replenishing the solution to a volume of 1 liter as has been explained in the previous example. This solution contains as major component magnesiumformate.

Experimental practice showed a similar effectivity, the magnesium-salt-solution having the same effect on the carbonate balance as a liter of aqueous solution having a carbonate hardness of 4800 degrees 'KH' ('KR'=carbonate hardness; hardness caused by hydrocarbonates that may be removed/precipitated by heat). The inventors deem the slightly lower effectivity explainable by present, symbiotic algae, which are known to incorporate magnesium so as to produce also chlorophyll; the magnesium-salt-solution allowed likewise to check and replenish the carbonate balance every 24 hours without any shortage in the carbonate supply occurring during said period.

In a further, especially advantageous embodiment 130 g calciumformate are dissolved in purified water as predescribed, using a slightly alkaline solution of a primeval limestone of organic origin in order to replenish the solution to a volume of one liter. The replenishing solution thus provides additionally about 2 g magnesium (Mg), below 1 g strontium (Sr), trace amounts of barium (Ba), sodium (Na) and potassium (K), selen (Se), molybdenum (Mo), vanadium (V) and lithium (Li), having chloride (Cl) as main anion and traces of iodide (I), bromide (Br) and fluoride (F). This solution showed general effects as predescribed in the other embodiments; especially advantageous was the application of said solution with reef-building systems: A reef-colony attached itself to an ornamental stone roughly 10% faster, providing a solid connection of the two more quickly, if the additional minerals were present. The trace content of iodide-anions seems to be an important, limiting factor. Similar, inventive salt-solutions starting with roughly 40 g calcium ions per liter and containing at least 40+−20 milligrams of iodide anions showed a comparable increase in speed of attachment.

INDUSTRIAL APPLICABILITY

Products for sea-water aquaristics—especially for bio-mineralization of reef-building systems—are subject of substantial, industrial exploitation. The present invention offers in this area for the first time a salt-composition for stabilizing a carbonate balance, wherein the salts comprise as main component with at least 10 weight percent formates, stabilizing the carbonate balance for 24 hours. The salts contain no fatties, proteins or sugars and stabilize with small oxygen-consumption the carbonate balance individually, being essentially disconnected from biochemical metabolism-cycles. The alkaline, ready to use solution of the salt-composition supports advantageously skeleton- and reef-building seawater-systems in their bio-mineralization. Use of the salt-composition to acidicly activate carbonate-containing ornamental aquaristic stones provides especially useful substrates, on which bio-mineralizing systems of sea-water aquariums settle and grow quicker.

The proposed, novel products and subject-matters feature a superior, lasting stability of thus-adjusted carbonate balance and an improved customers' compliance, providing a valuable contribution to industrially applicable and exploitable range of products.

The invention claimed is:
1. A method for supplementing a mineral balance in a sea-water aquaristic area, comprising:
adding an aquaristic stone into said sea-water aquaristic area, said aquaristic stone contains a carbonate and a salt composition including at least one alkali-salt or alkali-earth-salt of a non-branched carbon acid having an uneven number of C— atoms; and
adding formic acid into sea-water aquaristic area to create an acidic solution, said acidic solution is then infiltrated into said aquaristic stone effecting the activation of said stone by concluding reaction of the formic acid with the carbonate of the stone.

2. The method of claim 1 wherein, said carbon acid is at least one of formic acid, propionic acid, valeric acid or enanthic acid.

3. The method of claim 1 wherein, the salt-composition contains at least one inorganic salt of a metal, selected from the group consisting of Li, Rb, In, Ba, Al, Fe, Zn, Mo, Be, B, Si, Ti, Sc, Mn, V, Cr, Fe, Co, Ni, Se.

4. The method of claim 1, containing wherein said salt-composition includes
calcium(II)formate of the formula $Ca(HCOO)_2$.

5. The method of claim 1 wherein, said salt-composition includes an alkaline earth metal halide.

6. The method of claim 1 wherein, the salt-composition includes at least one carbonate of at least one metal selected from the group consisting of Mg, Ca, Sr, Li, Na, K.

7. The method of claim 1 wherein said salt-composition includes magnesium (II) formate of the formula $Mg(HCOO)_2$.

8. The method of claim 1 wherein, said aquaristic stone contains alkaline solution in its pores.

\* \* \* \* \*